United States Patent [19]

Belle Isle

[11] 3,786,357

[45] Jan. 15, 1974

[54] DIGITAL PULSE TRAIN FREQUENCY MULTIPLIER

[75] Inventor: Albert P. Belle Isle, Pittsfield, Mass.

[73] Assignee: General Electric Company

[22] Filed: Nov. 30, 1971

[21] Appl. No.: 203,357

[52] U.S. Cl. .................... 328/38, 328/127, 307/208

[51] Int. Cl. .............................................. H03k 5/00

[58] Field of Search .............................. 328/38, 127; 307/215, 220, 225, 295

[56] References Cited

UNITED STATES PATENTS

| | | | |
|---|---|---|---|
| 3,479,603 | 11/1969 | Isle | 307/208 |
| 3,504,288 | 3/1970 | Ross | 328/127 |
| 3,601,636 | 8/1971 | Marsh | 307/208 |
| 3,673,434 | 6/1972 | McIntosh | 307/208 |
| 3,543,295 | 11/1970 | Overstreet | 307/208 |
| 3,541,456 | 11/1970 | Feder | 307/208 |
| 3,634,771 | 1/1972 | Hermel | 307/215 |
| 3,571,725 | 3/1971 | Kaneko | 307/215 |
| 3,546,601 | 12/1970 | Hiltz | 328/127 |
| 3,002,152 | 9/1961 | Yeaton | 328/127 |
| 3,345,584 | 10/1967 | Nakagawa | 328/127 |

*Primary Examiner*—John W. Huckert
*Assistant Examiner*—R. E. Hart
*Attorney*—Francis K. Richwine

[57] ABSTRACT

A pair of digital differentiators respectively generate pulses at the leading and the trailing edges of an input pulse, doubling the pulse input frequency. This doubling is used for reduction of errors in digital transmission and for frequency multiplication by powers of two and by values other than powers of two.

8 Claims, 24 Drawing Figures

FIG.1

DIGITAL PULSE TRAIN FREQUENCY MULTIPLIER

BACKGROUND OF THE INVENTION

1. Field of the Invention

This invention relates to digital electrical pulse handling and more specifically to the use of digital differentiators for frequency multiplication.

2. Description of the Prior Art

Frequency doublers have previously been known which used tuned amplifier circuits or other analog circuits for frequency doubling. Others have required the use of bistable devices and a delayed reset for frequency doubling.

SUMMARY OF THE INVENTION

This invention uses a very simple, inexpensive digital differentiator as an element in a pulse doubler. The invention is adapted for use with conventional integrated circuitry. The resulting pulse doubler is well-adapted for use in pulse multiplication or pulse transmission.

BRIEF DESCRIPTION OF THE DRAWINGS

FIGS. 2A-M are diagrams of waveforms theoretically occurring in the device according to FIG. 1;

DESCRIPTION OF THE PREFERRED EMBODIMENT

Figure 1:
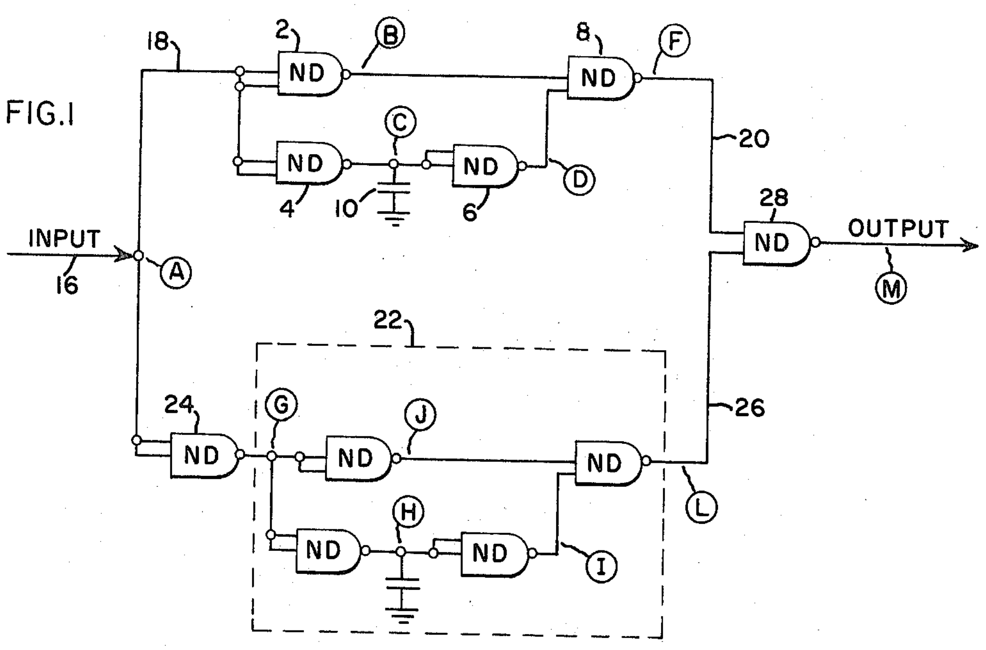
FIG. 1 is a schematic block diagram of a pulse doubler according to the invention.

FIG. 1 is a schematic block diagram of a pulse doubler according to the present invention. The invention uses digital logic circuits with delay to create a digital differentiator. In this embodiment, the digital differentiator generates a complete DOWNwardly directed (zero-going) output pulse at the DOWNwardly directed (zero-going) edge of an input pulse. If the input pulse is inverted before being applied to the digital differentiator, this embodiment will generate a complete DOWNwardly directed output pulse at the UPwardly directed edge (before inversion) of the input pulse. Combining, in a NAND gate, the two DOWNwardly directed output pulses, yields two UPwardly directed output pulses, respectively, at the beginning and at the end of the input pulse.

NAND gates 2, 4, 6 and 8, and capacitance 10 form a first digital differentiator. In the particular reduction to practice which resulted in the oscilloscope waveforms of FIG. 3, the NAND gates were FDTμL-946 Quad 2-Input NAND integrated circuits, and the capacitance 10 was the inherent output capacitance of gate 4 supplemented by a 60 picofarad capacitor. (If the digital differentiator was mounted on a multilayer printer circuit card, this supplemental capacitance could be built in as run-to-run capacitance.) NAND gates 2, 4 and 6 have their inputs tied together so as to function as inverters and could be replaced by one half of a Hex Inverter integrated circuit. (In fact, if inverters are available which do not have active pull-up outputs, so as to permit "Wired AND" connections, every NAND gate in FIG. 1 could be replaced with an inverter circuit.)

Figure 2A:
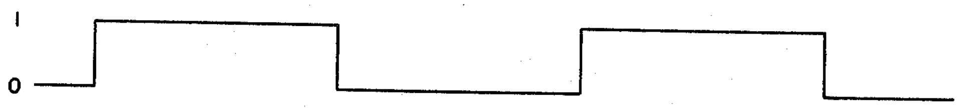
Figure 2B:
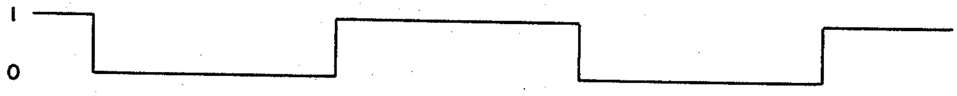
Figure 2C:
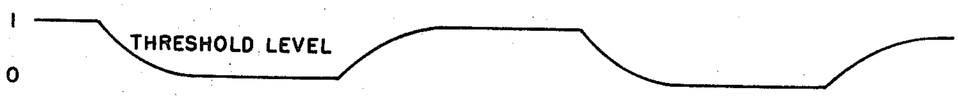

A digital input signal A appears on line 16 in FIG. 1, and then line 18, as illustrated in FIG. 2A. Signal A is inverted by NAND gate 2, resulting in signal B at the output of NAND gate 2, as illustrated in FIG. 2B. Signal A is also inverted by NAND gate 4, whose inherent output impedance and capacitance 10 combine to form an RC charging circuit, which yields signal C at the input of NAND gate 6 as illustrated in FIG. 2C. An approximate threshold level for NAND gate 6 is also illustrated in FIG. 2C. The actual threshold level may differ widely from that illustrated with no significant effect other than varying the width of the digital differentiator's output pulses.

Figure 2D:
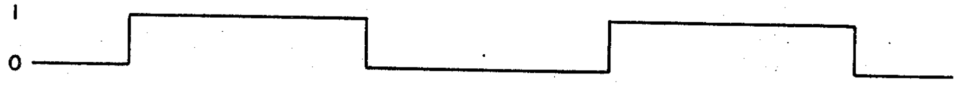
Figure 2F:
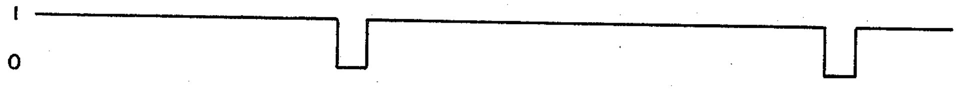
Figure 2G:
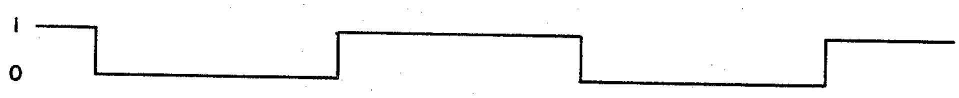
Figure 2H:
Figure 2I:
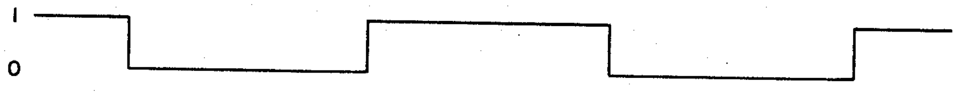
Figure 2J:
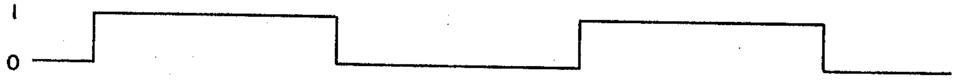
Figure 2L:
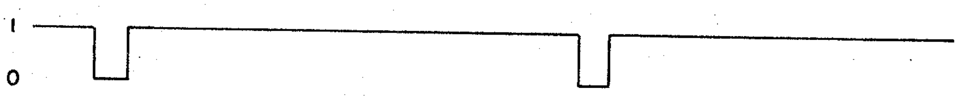

When signal C reaches the threshold level of gate 6, the gate switches yielding signal D at its output, which is illustrated in FIG. 2D. Thus, the output of NAND gate 6, signal D, is a delayed version of input signal A. Since the output of NAND gate 8 will go low only when both of its inputs are high, applying a delayed version of the input (signal D) and an inverted version of the input (signal B) to the inputs of NAND gate 8 yields a DOWNwardly directed pulse on line 20 immediately after the DOWNwardly directed edge of the input pulse of signal A. This signal (labelled F) is illustrated in FIG. 2F.

The circuit of FIG. 1 includes a second digital differentiator 22, constructed in the same manner as that comprising elements 2, 4, 6, 8 and 10. The signals at points G, H, I, J and L are respectively illustrated in FIGS. 2G, 2H, 2I, 2J and 2K. Because NAND gate 24 inverts signal A before applying it to digital differentiator 22, signal L on line 26 provides pulses at the leading edges of the pulses of signal A, rather than at the lagging edges as in signal F.

Figure 2M:
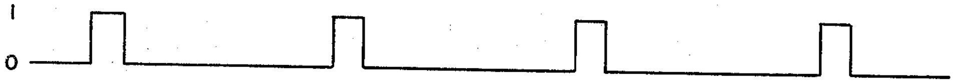

Signal F and signal L are then combined in a NAND gate 28 to generate a positive-going pulse in a signal M (FIG. 2M) for each pulse in either signal F or signal L. NAND gates 24 and 28 may be from an FDTμL 932 Dual Buffer NAND integrated circuit.

Figures 3A, 3B:
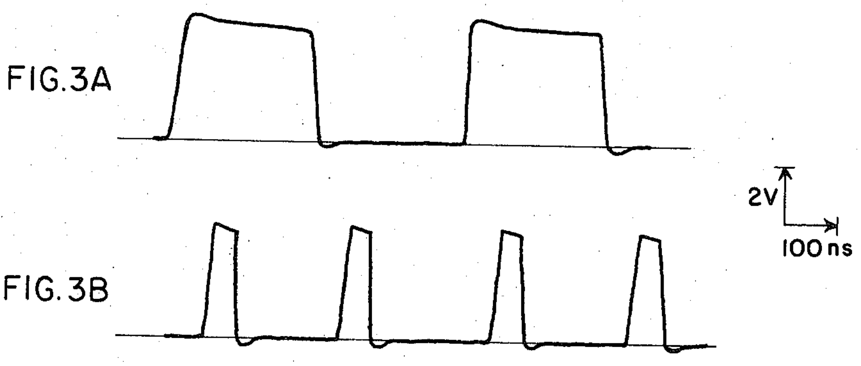
FIGS. 3A-3B are diagrams of actual input and output waveforms occurring in the device according to FIG. 1.

FIGS. 3A and 3B illustrate waveforms from an actual working embodiment of the invention according to FIG. 1, respectively corresponding to signals A and M.

Figure 4:
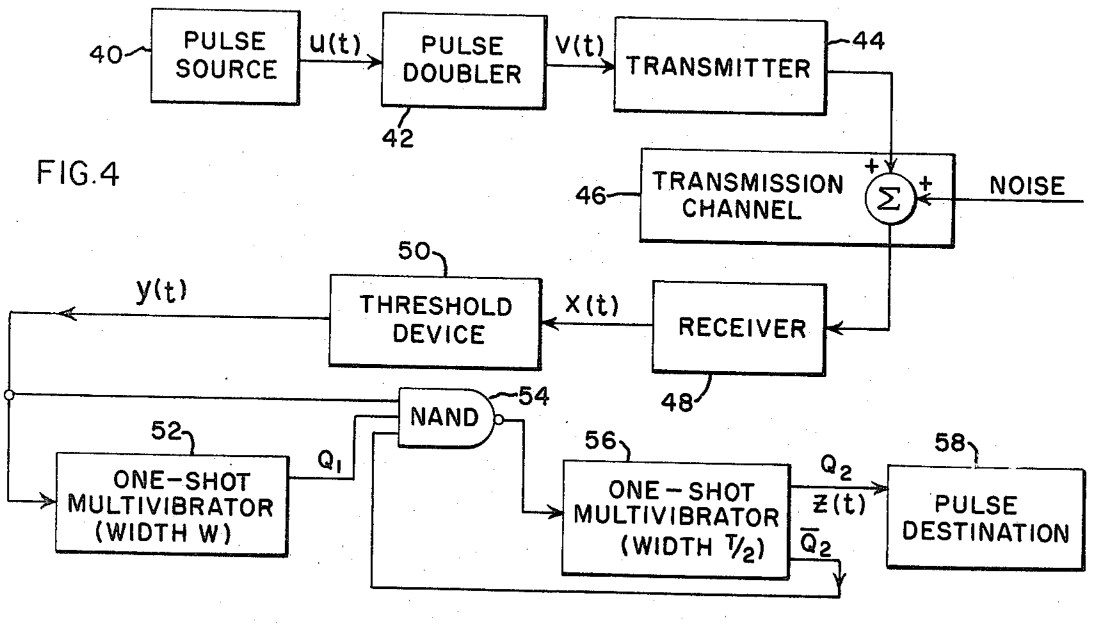
FIG. 4 is a schematic block diagram of a system using the present invention in a system for data transmission through a noisy channel.

FIG. 4 is a schematic block diagram of a system using the present invention in a system for data transmission through a noisy channel. Data $u(t)$ from a pulse source 40 is applied to a pulse doubler 42 according to the present invention to provide a doubled signal $v(t)$. Signal $v(t)$ is applied to a transmitter 44 to be sent through a noisy transmission channel 46 to receiver 48. Receiver 48 provides a signal $x(t)$ to a threshold device 50. Device 50 removes all signals below the threshold value to provide signal $y(t)$. The threshold level must be adjusted such that the occasions when the noise level passes the threshold value more than once during a time interval $W$, where $W$ may be five-eighths the pulse interval $T$ of source 40, are very rare. Each such occasion will cause an error.

In the output $y(t)$ of threshold device 50 will be two types of pulses—paired pulses representing transmitted data and single error pulses from the noisy channel. The paired pulses will always be $T/2$ apart, as measured from pulse beginning to pulse beginning. The error pulses will be scattered at random. If a receiving circuit is designed to pair the pulses by generating an output pulse each time a second pulse occurs within ⅝ $T$ of a first pulse, precautions being taken that the second pulse is not also taken as a new first pulse, then the second pulse can be used for error checking the first pulse, thereby eliminating error pulses.

The circuit comprising one-shot multivibrator 52, NAND gate 54, and one-shot multivibrator 56, serves to pair the pulses as described. Input pulses from device 50 are applied to trigger one-shot 52 and to one input of NAND gate 54. The unstable output $Q_1$ of one-shot 52 is applied to a second input of NAND gate 54. The output of NAND gate 54 is applied to trigger one-shot 56, and the stable output $\overline{Q_2}$ of one-shot 56 is applied as a third and final input to NAND gate 54. The unstable output $Q_2$ of one-shot 56 is applied to some utilization device 58 as the system output. It should be noted that one-shot 52 has an unstable period $W = ⅝\ T$, while one-shot 56 has an unstable period ½ $T$.

Thus NAND gate 54 triggers one-shot 56 to provide a ONE output pulse when three conditions are simultaneously met, i.e., 1. $\overline{Q_2} = 1$, the one-shot 56 is stable and is thus now providing a binary ZERO output;
2. $Q_1 = 1$, the one-shot 52 is unstable and is within a period W since being triggered by a first signal; and
3. $y(t)$ is presently 1, thus a second pulse is present within a period W from a first pulse, and, from condition 1 no pulse has been counted as a proper output within an interval $T/2$.

Figures 5A, 5B, 5C, 5D, 5E, 5F:
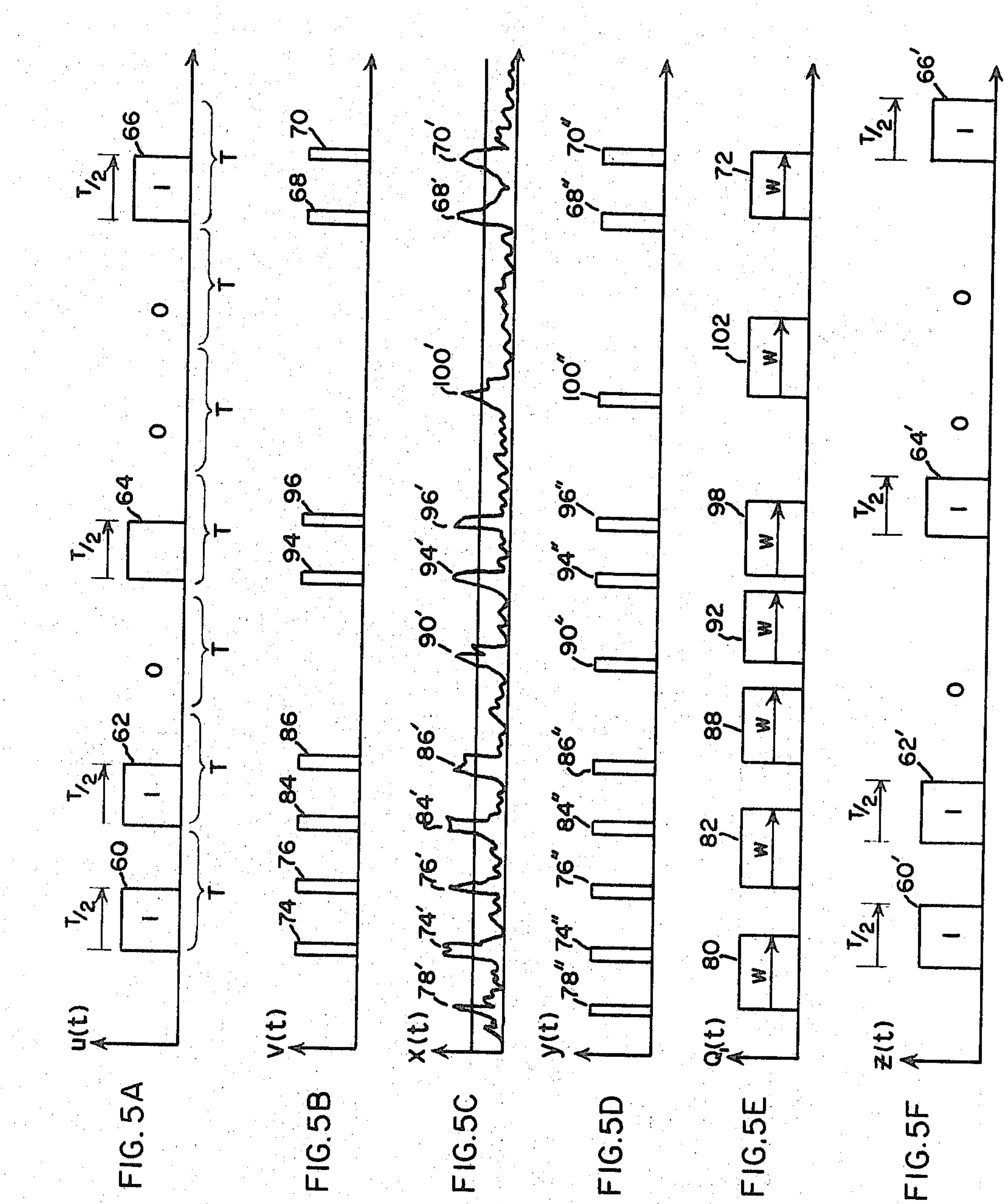
FIGS. 5A-F are diagrams of waveforms theoretically occurring in the system of FIG. 4.

Referring now to FIGS. 5A through 5F, these figures show the waveforms associated respectively with waves $u(t)$, $v(t)$, $x(t)$, $Q_1(t)$ and $Z(t)$. In FIG. 5A are illustrated four ONE pulses, 60, 62, 64 and 66, each beginning at the beginning of an interval $T$ and extending $T/2$. Three occasions are also marked where no pulse occurs during a $T$ interval.

Taking first an error-free case with no complications, consider pulse 66. Pulse doubler 42 acts upon it to generate a pair of pulses 68 and 70 in signal $v(5)$. This signal passes through the noisy transmission channel as pulses 68' and 70' to be restored by threshold device 50 as signals 68'' and 70'' in signal $y(t)$. Pulse 68'' triggers one-shot 52 to its unstable state but does not pass NAND gate 54. Thus the output of one-shot 52 generates a pulse 72 as part of signal $Q_1(t)$. When pulse 70'' occurs during pulse 72, it passes NAND gate 54 to trigger one-shot 56, thereby producing pulse 66' in the signal $Z(t)$. Pulse 66' reproduces pulse 66 at the output of the receiver.

Now considering pulse 60, the pulse doubler produces pulses 74 and 76 which pass through the noisy transmission medium as pulses 74' and 76' and are reproduced by the threshold device as pulses 74'' and 76''. But an additional error pulse 78' was added by noise to create error pulse 78'' in the threshold device output $y(t)$. Pulse 78'' triggers one-shot 52 to produce pulse 80 of width $W$. During time interval $W$, pulse 74'' occurs, causing pulse 60' to reproduce pulse 60. Pulse 76'' again triggers one-shot 52 to produce pulse 82 with width $W$. Pulse 84'' from the leading edge of pulse 62 occurs during pulse 82, thereby triggering pulse 62' to reproduce pulse 62. Pulse 86'' occurs at the trailing edge of pulse 62, triggering one-shot 82 to produce pulse 88. No additional pulse occurs during pulse 88, so no output pulse is produced.

Noise pulse 90' causes the threshold device to produce a pulse 90'', thereby triggering a pulse 92 of width W. However, the next pulse 94'' occurs after the time interval W is over, so no output pulse is triggered by noise pulse 90'. Pulse 64 is treated as was pulse 66, with pulses 94 and 96 being transmitted as pulses 94' and 96' and being reproduced as pulses 94'' and 96'' to respectively trigger and be passed by pulse 98 to form pulse 64'.

Pulse 100' is a noise-created pulse which passes the threshold device as pulse 100'' to create pluse 102. Because no other pulse occurs during pulse 102, no output pulse is provided.

In this system, the output information has lost the phase information of the original digital data, but the number of pulses is correct. In the preferred embodiment, $W = ⅝\ T$, but in general $T/2$ is less than or equal to $W$ which is less than $T$.

Figure 6:
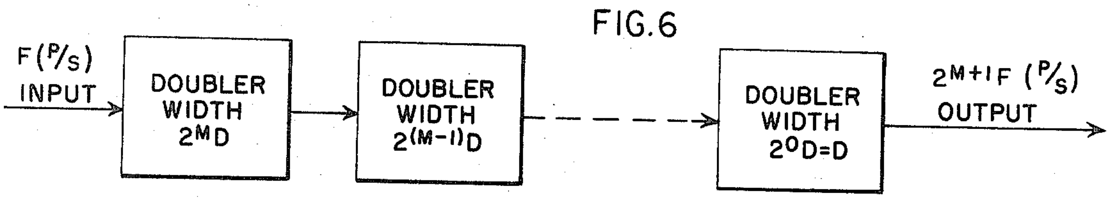
FIG. 6 is a schematic block diagram of a system using the present invention to multiply the frequency of an input signal by an integral multiple of two.

FIG. 6 illustrates a system using pulse doublers according to the invention to multiply a digital frequency by any integral power of 2. The width of the two output pulses from the doubler must be controlled so that each doubler in the series is presented with an input pulse long enough so that two separate output pulses can be produced during each input pulse. This control is accomplished by varying the delay in the digital differentiator stage of the frequency doubler.

Figure 7:
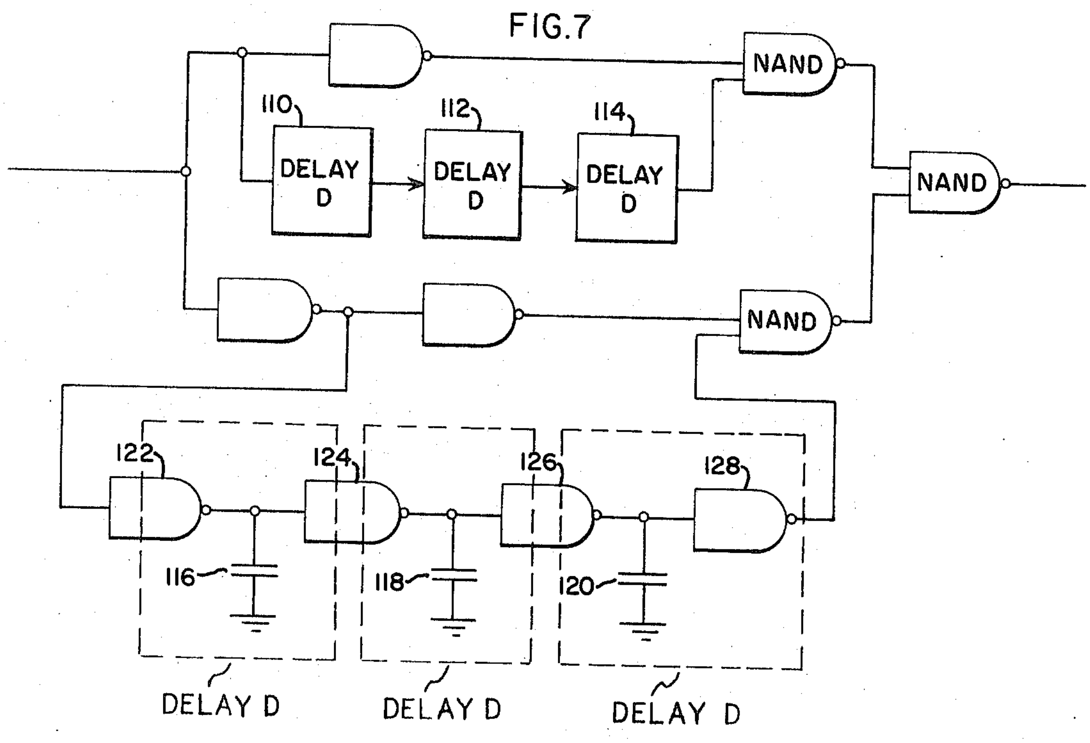
FIG. 7 is a schematic block diagram of another embodiment of a pulse doubler according to the invention, this embodiment being especially useful in the system of FIG. 6.

FIG. 7 illustrates a frequency doubler similar to that of FIG. 1 except that several delay units 110, 112 and 114 are used in series to control the pulse width as needed for the system of FIG. 6. This delay can be provided by capacitors 116, 118 and 120 used in connection with series gages 122, 124, 126 and 128. In the example of FIG. 7, each of the two digital differentiators in the frequency doubler provides three delay units in series. If an even number of delay units is needed, an additional inverter may be needed to correct the polarity.

Figure 8:
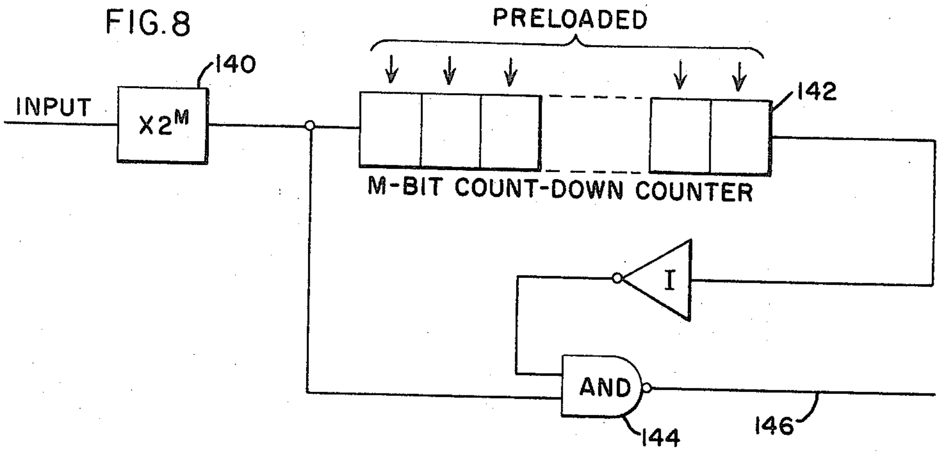
FIG. 8 is a schematic block diagram of a system for multiplying a number by values other than an integral power of two.

FIG. 8 is a block diagram of a system for multiplying a number by values other than an integral power of two. Unit 140 multiplies the input signal by two to the power $M$ to produce an output signal to countdown counter 142 and to one input of an AND gate 144. Counter 142 is preloaded with a number $R$ such that the output of AND gate 144 produces an output pulse each time the counter counts down from $R$ to zero. This output pulse, on line 146, represents the input frequency multiplies by $2^m/R$.

I claim:

1. A digital frequency multiplication system comprising:

a. means for receiving a train of digital input pulses, each of said input pulses having a leading edge and a trailing edge, b. first digital differentiator means responsive to each leading edge for producing a corresponding pulse in a first train of pulses, c. second digital differentiator means responsive to each trailing edge for producing a corresponding pulse in a second train of pulses, d. each of said digital differentiator means comprising
   1. a first path for transmitting said input pulses substantially without delay,
   2. a second path for transmitting said input pulses with a predetermined delay,
e. means for combining said first train of pulses and said second train of pulses to produce a third train of pulses having a pulse corresponding to each leading edge and a pulse corresponding to each trailing edge, said means for combining said first and second trains of pulses including means for inverting pulses in one of said digital differentiators, whereby said third train of pulses has a frequency double that of the train of digital input pulses.

2. A system according to claim 1 wherein said means for combining said first and second trains of pulses further comprises an inverter connected between the means for receiving a train of digital input pulses and one of said digital differentiators to cause said one digital differentiator to be responsive to a different one of leading and trailing edge than it would otherwise be responsive to.

3. A system according to claim 1 wherein, a. said first path comprises a first inverter, said first inverter receiving said input pulses and providing an inverted output,
b. said second path comprises a capacitor, a second inverter connected to receive said input pulses and to provide an intermediate inverted output across said capacitor, and a third inverter receiving an input signal from said capacitor, providing a delayed noninverted version of said input pulses,
c. said combining means comprises a two-input NAND gate fed by the output of said first inverter and the output of said second inverter.

4. A system according to claim 3 wherein each of said inverters comprises a NAND gate having its inputs tied together.

5. A system according to claim 1 wherein the minimum time from leading edge to next leading edge of pulses in said train of digital input pulses is $T$ and wherein the time from leading edge to trailing edge of pulses in said train of digital input pulses is substantially one-half $T$, further comprising:

a. means for transmitting said third train of pulses through a noisy transmission channel to provide a fourth train of pulses including the pulses of the third train plus added error pulses,
b. means for initiating pulses of width $W$, where $W$ is longer than or equal to one-half $T$ but shorter than $T$, whenever a pulse of width $W$ does not currently exist and simultaneously a pulse occurs in said fourth train, and
c. means for initiating pulses of width substantially one-half $T$ whenever a pulse of width one-half $T$ does not currently exist and simultaneously a pulse of width $W$ exists and simultaneously a pulse is initiated in said fourth train.

6. A system according to claim 1 for multiplication by a number other than two further comprising an additional frequency doubler connected to receive said third train as its input, whereby to redouble the frequency of the pulses in the third train.

7. A system according to claim 6 wherein an inherent delay in each of the first and second digital differentiators is greater than an inherent delay used for a corresponding purpose in the additional frequency doubler.

8. A system according to claim 6 further comprising:

a. a countdown counter preloaded with a given number and counted down by pulses of some frequency redoubled a predetermined number of times, and
b. a coincidence gate for providing an output when the counter counts down to zero and a redoubled frequency pulse occurs.

* * * * *